(12) United States Patent
Nogami

(10) Patent No.: US 7,136,331 B2
(45) Date of Patent: Nov. 14, 2006

(54) DISK DRIVE

(75) Inventor: Toyoshi Nogami, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 541 days.

(21) Appl. No.: 10/705,009

(22) Filed: Nov. 10, 2003

(65) Prior Publication Data

US 2004/0095856 A1    May 20, 2004

(30) Foreign Application Priority Data

Nov. 12, 2002  (JP) .............................. 2002-328369

(51) Int. Cl.
*G11B 7/00* (2006.01)

(52) U.S. Cl. .................. 369/44.21; 720/681; 359/814; 359/824

(58) Field of Classification Search ............. 369/44.21; 720/681; 359/813, 814, 823, 824
See application file for complete search history.

(56) References Cited

U.S. PATENT DOCUMENTS

| 5,444,684 | A | * | 8/1995 | Yanagi et al. ............. 369/44.28 |
| 5,986,825 | A | * | 11/1999 | Marino et al. ............... 359/808 |
| 6,445,674 | B1 | * | 9/2002 | Morita ........................ 720/671 |
| 6,452,895 | B1 | * | 9/2002 | Kawano ..................... 720/681 |
| 2003/0016597 | A1 | * | 1/2003 | Haruguchi et al. ...... 369/44.16 |

FOREIGN PATENT DOCUMENTS

| JP | 63-10330 | 1/1988 |
| JP | 6-119725 | 4/1994 |
| JP | 9-102134 | 4/1997 |
| JP | 9-288833 | 11/1997 |
| JP | 10-003674 | 1/1998 |
| JP | 10-283647 | 10/1998 |
| JP | 10-320797 | 12/1998 |
| JP | 2000-20986 | 1/2000 |
| JP | 2000-331360 | 11/2000 |
| JP | 2001-067693 | 3/2001 |
| JP | 2002-74711 | 3/2002 |
| JP | 2003-281751 | 10/2003 |

OTHER PUBLICATIONS

Japanese Office Action dated Feb. 15, 2005 for Japanese Application No. 2002/328369 with English Translation (5 pages).
Patent Abstracts of Japan; Publication No. 09-102134 dated Apr. 15, 1997 (1 page).
Patent Abstracts of Japan; Publication No. 63-010330 dated Jan. 16, 1988 (1 page).

(Continued)

*Primary Examiner*—Wayne Young
*Assistant Examiner*—Minerva Rivero
(74) *Attorney, Agent, or Firm*—Osha Liang LLP

(57) ABSTRACT

An optical pick-up includes a lens holder and a lens holder supporting portion. The lens holder has a focusing coil, a tracking coil, and a pair of nickel plates arranged to sandwich the focusing coil from the top and the bottom. The lens holder supporting portion includes a pair of permanent magnets having their magnetic poles of the same polarity opposite to each other and sandwiching the lens holder as seen in two dimensions. A sidewall of a slide hole is pressed against a slide shaft. Thus, a disk drive which can suppress a jerky motion of the lens holder when it moves along the slide shaft with a simple mechanism is provided.

5 Claims, 5 Drawing Sheets

OTHER PUBLICATIONS

Patent Abstracts of Japan; Publication No. 06-119725 dated Apr. 28, 1994 (1 page).
Patent Abstracts of Japan, Publication No.: 10-283647, Publication Date: Oct. 23, 1998, 1 page.
Patent Abstracts of Japan, Publication No.: 09-288833, Publication Date: Nov. 4, 1997, 1 page.
Patent Abstracts of Japan, Publication No.: 2000-331360, Publication Date: Nov. 30, 2000, 1 page.
Patent Abstracts of Japan, Publication No.: 2003-281751, Publication Date: Oct. 3, 2003, 1 page.
Patent Abstracts of Japan, Publication No.: 10-003674, Publication Date: Jan. 6, 1998, 1 page.
Patent Abstracts of Japan, Publication No.: 2001-067693, Publication Date: Mar. 16, 2001, 1 page.
Patent Abstracts of Japan, Publication No.: 10-320797, Publication Date: Dec. 4, 1998, 1 page.
Notice of Ground Rejection for Japanese Patent Application No.: 2002-328369 mailed on Jun. 7, 2005 and English translation thereof (12 pages).
Patent Abstracts of Japan, Publication No. 2000-020986 dated Jan. 21, 2000, 2 pgs.
Patent Abstracts of Japan, Publication No. 2002-074711 dated Mar. 15, 2002, 2 pgs.

* cited by examiner

DISK DRIVE

BACKGROUND OF THE INVENTION

1. Field of the Invention

The present invention relates to a disk drive, and more particularly to a disk drive suppressing a jerky motion of a lens holder upon alignment of light beams irradiating a disk.

2. Description of the Background Art

In a disk drive for a compact disk (CD), a mini disk (MD) or the like, an objective lens is used to collect light beams on a disk surface to form a spot. A mechanism for reducing the spot size is provided, since a smaller spot size enables higher-density recording of information on the disk. Specifically, the mechanism causes the light beams from an optical pick-up to impinge on the disk surface in a right angle to prevent coma.

A disk has tracks on which information is recorded. Tracking of a track is conducted, as is well known, by disk rotation by rotation of a turntable, and by movement of an optical pick-up along a guide shaft. A disk suffers bend, eccentricity and others, hindering accurate tracking of an information-recorded position on the disk only in the above-described manner. There is a need for an adjustment mechanism which can track the information-recorded position accurately to read the information therefrom even if the position is displaced due to an unexpected external factor.

The objective lens is fixed to a lens holder. The lens holder is supported by a lens holder supporting portion which moves along the guide shaft. The lens holder is provided with a slide hole, and the lens holder supporting portion is provided with a slide shaft. The lens holder is supported by the lens holder supporting portion with the slide shaft penetrating the slide hole.

In the above-described adjustment mechanism in a conventional device, the lens holder is made to move in a direction along which the slide shaft extends, to make the light beams focused on a spot. The lens holder is also made rotatable about the slide shaft, for two-dimensional alignment of the tracks. Specifically, a magnetically driven portion for focusing and a magnetically driven portion for tracking are provided between the lens holder and the lens holder supporting portion. The magnetically driven portions for focusing and for tracking constitute the above-described adjustment mechanism. Normally, focusing and tracking coils are mounted on the lens holder side, and focusing and tracking permanent magnets are arranged on the lens holder supporting portion side opposite to the coils.

When a current is passed through the focusing coil, the lens holder is driven up and down along the slide shaft by magnetic force, and thus, focusing adjustment of the objective lens attached to the lens holder is carried out. Similarly, when a current is passed through the tracking coil, the lens holder is rotated about the slide shaft by magnetic force, so that tracking adjustment is carried out. Provision of the mechanisms both for focusing adjustment and tracking adjustment makes it possible, even if the information-recorded position is displaced by any external factor, to deal with the displacement of the spot position from the track to accomplish accurate tracking of the track position.

It however is necessary to provide a prescribed clearance between the slide hole of the lens holder and the slide shaft of the lens holder supporting portion, which clearance causes the lens holder to jerkily shift when it moves for the adjustment as described above. Once the jerky motion occurs, the quality of the information, and hence, the performance as the information reproduction device would be degraded. To prevent such a jerky motion due to the clearance, means for applying side or lateral pressure has been proposed, which presses the sidewall of the slide hole of the lens holder against the slide shaft. With this means, however, problems have been pointed out that high working accuracy is required and that friction between the slide shaft and the slide hole causes vibrations and the like. Thus, there has been proposed, to solve the problems, to maintain a contact position between the slide shaft and the slide hole at a specific position (e.g., Japanese Patent Laying-Open Nos. 2000-20986 and 2002-74711).

In the conventional disk drive shown in FIG. 9, magnetic pieces 154 are arranged on both ends of a center line L of a lens holder 104 to which an objective lens 110 is attached. Magnetic force between magnetic pieces 154 and permanent magnets 151, 152 opposite to the respective magnetic pieces produces lateral pressure M against lens holder 104. A slide shaft 103 and a slide hole 141 are brought into contact with each other at a portion 143 of a rim of slide hole 141 in contact with center line L. This contact point 143 is made to match the center of gravity G of lens holder 104. In a normal operation, the slide hole and the slide shaft come into contact with each other at contact point 143. Thus, contact point 143 also functions as the center H of rotation driving force resulting from the force generated between tracking permanent magnets 151, 152 and tracking coils 153. As such, maintaining the contact point at a specific position prevents vibrations from occurring and ensures smooth and high-precision adjustment.

To make the slide shaft and the slide hole contact at a prescribed position, however, it is necessary to increase the working accuracy of the lens holder and also increase the accuracy in positioning of the permanent magnets. In view of the foregoing, there has been a demand for development of a disk drive suppressing the jerky motion of a lens holder attributable to the clearance between the slide hole and the slide shaft with a simple mechanism.

SUMMARY OF THE INVENTION

An object of the present invention is to provide a disk drive which can suppress the jerky motion of a lens holder with a simple mechanism when the lens holder is moved for alignment of light beams.

A disk drive according to the present invention includes a turntable attached to a chassis and rotating a disk mounted thereon, a guide shaft fixed to the chassis, and an optical pick-up rotatably attached to and moving along the guide shaft. The optical pick-up has a lens holder provided with a slide hole and holding an objective lens emitting light beams irradiating the disk on the turntable, and a lens holder supporting portion having a slide shaft penetrating the slide hole and supporting the lens holder. The lens holder includes a focusing coil arranged to be wound around the slide hole for causing the lens holder to move along the slide shaft such that the light beams are focused on a track of the disk, a tracking coil wound at a side portion of the lens holder around a direction crossing the slide shaft for causing the lens holder to rotate around the slide shaft to establish two-dimensional alignment of the light beams, and a pair of ferromagnetic plates arranged to sandwich the focusing coil from the top and the bottom and provided with a hole to include the slide hole. The lens holder supporting portion includes a first permanent magnet and a second permanent magnet sandwiching the lens holder as seen in two dimensions and having their magnetic poles of the same polarity opposite to each other. A sidewall of the slide hole of the lens holder is pressed against the slide shaft of the lens holder supporting portion.

With such a configuration, the two permanent magnets have their magnetic poles of the same polarity arranged opposite to each other. Thus, the sidewall of the slide hole is prevented from being pressed against the slide shaft, i.e., lateral pressure does not occur, as long as the permanent magnets and the ferromagnetic plates are arranged to keep magnetic balance, avoiding adverse effects on focusing and tracking. By adjusting to loose the magnetic balance, however, the two ferromagnetic plates can be magnetized in one direction in accordance with intensities of the magnetic flux densities of the two permanent magnets. As a result, the lens holder is magnetized in one direction, and the sidewall of the slide hole is pressed against the slide shaft. The two permanent magnets and/or the two ferromagnetic plates can readily be adjusted in shape, in position, or in property of the materials of the permanent magnets, to bias the magnetic balance.

In the above configuration, the two ferromagnetic plates are arranged to sandwich the focusing coil from the top and the bottom. Thus, magnetic force is received at the two positions spaced from each other when the magnetic balance is lost. This makes it possible to press the lens holder against the slide shaft more stably than in the case where the magnetic force is received at one position. Thus, the lens holder is prevented from tilting, and generation of vibrations or the jerky motion is suppressed when the lens holder moves along the slide shaft for focusing or tracking.

Further, arrangement of the ferromagnetic plates in two dimensions (in horizontal posture) to sandwich the focusing coil from the top and the bottom suppresses generation of a demagnetizing field with respect to the lateral magnetic flux when adjusting to loose the magnetic balance. Thus, it is possible to generate sufficiently large pressing force with small magnetizing force to prevent the jerky motion of the lens holder.

Preferably, the first and second permanent magnets and the slide shaft are arranged on a straight line as seen in two dimensions, and a distance between the first permanent magnet and the slide shaft differs from a distance between the second permanent magnet and the slide shaft.

With this configuration, the magnetic balance is lost, and the lens holder is attracted to one of the permanent magnets located closer to the lens holder. Thus, a gap is generated between the slide hole and the slide shaft on the side being attracted, and the sidewall of the slide hole is pressed against the slide shaft on the opposite side. With this configuration, all that is needed is to slightly change the positions of the permanent magnets. Accordingly, the above-described pressing is achieved in a very simple manner.

The first and second permanent magnets may be different in magnetizing capability from each other.

With this configuration, it is possible to achieve the above-described pressing only by biasing the balance of the magnetizing forces of the two permanent magnets, hardly changing the dimensional features. To make a difference in the magnetizing capabilities, a property related to the materials, e.g., a maximum value of the BH product, (BH) max, or antimagnetic force Hc, may be changed. Alternatively, a dimensional factor, e.g., thicknesses of the permanent magnets, may be changed. A thinner permanent magnet causes a greater demagnetizing field, which degrades effective magnetizing capability.

The ferromagnetic plates are magnetized by the first and second permanent magnets. Each ferromagnetic plate may be asymmetric in shape with respect to the slide hole as seen in two dimensions, such that the magnetization occurs in a direction crossing the slide shaft.

With this configuration, again, it is possible to adjust to loose the magnetic balance so as to generate lateral pressure. The stress being applied on each ferromagnetic plate may be set in an arbitrary direction in accordance with its asymmetric shape, e.g., (a1) on one side or (a2) on the other side of a straight line connecting the two permanent magnets, or (a3) on the side of one permanent magnet or (a4) on the side of the other permanent magnet along the straight line, as seen in two dimensions. It is needless to say that the pressed position changes in accordance with the direction of the stress.

Further, the ferromagnetic plates may be nickel plates. Nickel is unlikely to rust, readily available, and is resistant to heavy working by virtue of its face-centered cubic structure.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, embodiments of the present invention will be described with reference to the drawings.

First Embodiment

Figure 1:
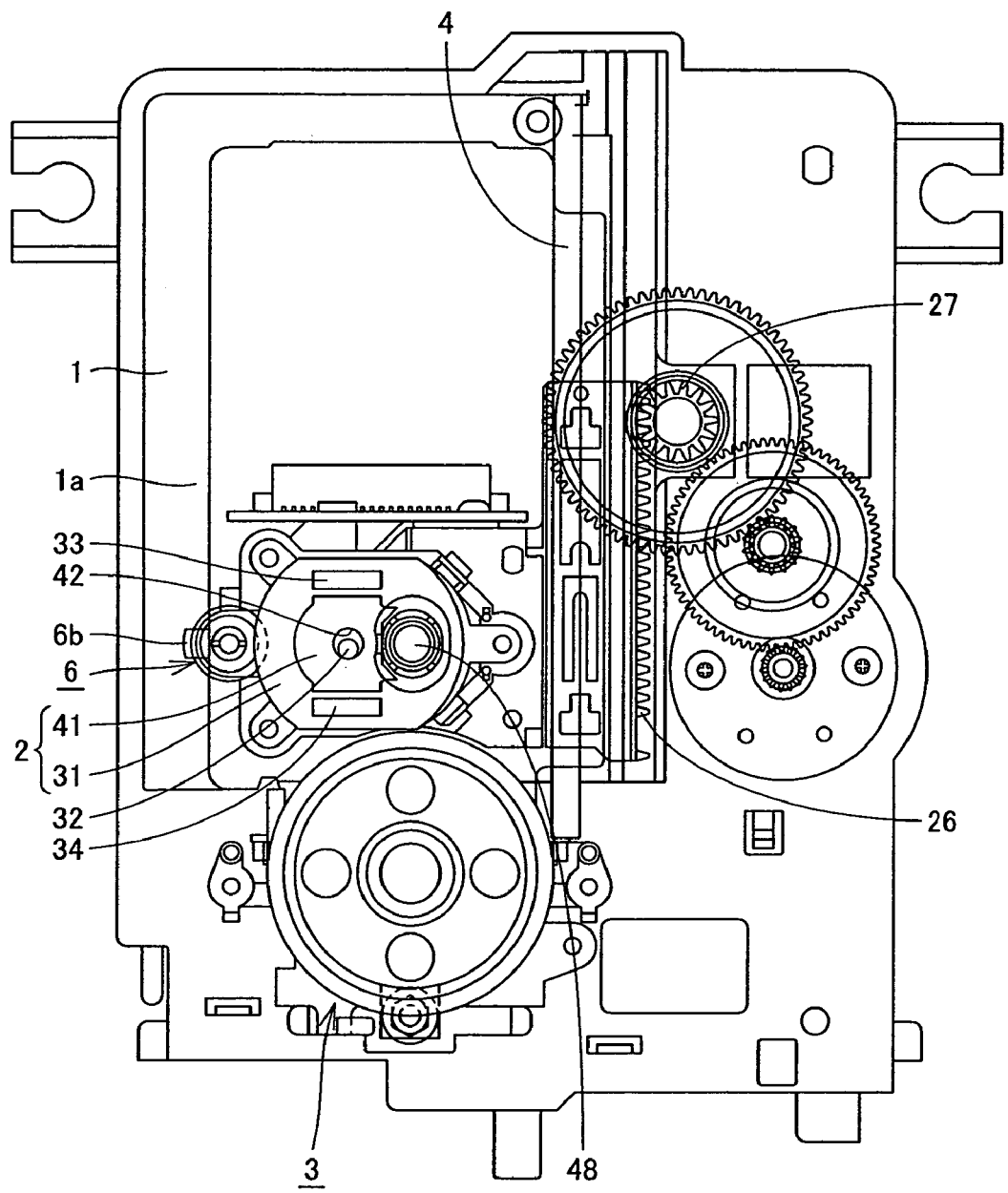
FIG. 1 is a plan view showing a disk drive according to a first embodiment of the present invention.
Figure 2:
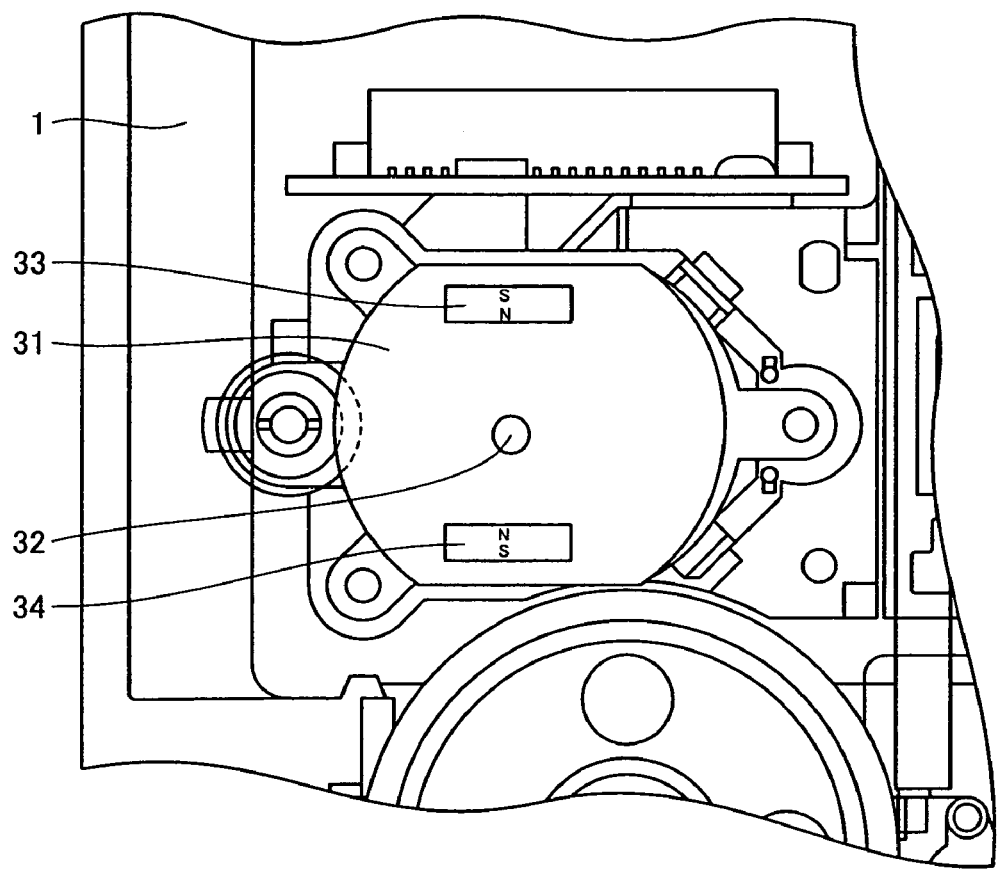
FIG. 2 shows a lens holder supporting portion in the disk drive of FIG. 1, after a lens holder is removed therefrom.

FIGS. 1 and 2 show a disk drive according to a first embodiment of the present invention. FIG. 1 shows a state where a lens holder 41 is supported by a lens holder supporting portion 31, and FIG. 2 shows lens holder supporting portion 31 from which lens holder 41 has been removed. Lens holder 41 may be removed completely from the lens holder supporting portion as shown in FIG. 2, or may be connected by a flexible member with its movements for tracking and focusing being allowed.

In this disk drive, an optical pick-up 2 engages with a guide shaft 4 to freely rotate about and freely move along the guide shaft. Although one guide shaft is shown in FIG. 1, the present invention is of course applicable to a device provided with two guide shafts. Optical pick-up 2 has lens holder 41 and lens holder supporting portion 31 supporting lens holder 41. A slide shaft 32 stands erect from the floor surface of the lens holder supporting portion, and penetrates a slide hole 42 of lens holder 41.

The optical pick-up is driven along the guide shaft by a rack 26 and a pinion 27. A disk (not shown) is mounted on a turntable 3. Light (laser) beams pass through an objective lens 48 held by the lens holder and irradiate the disk located above the objective lens. A beam angle adjustment mechanism to make the beams impinge on the disk in a right angle is provided. Specifically, the lens holder supporting portion has an end engaged with guide shaft 4, and another end engaged with flange members 6b attached to a male screw member 6 to sandwich a rim 1a of a chassis from the top and the bottom. Manipulation of the male screw member to change the degree of screw-in can change a distance from rim 1a of the chassis to the surface on which lens holder supporting portion 31 is mounted, to thereby change the amount of tilt of the lens holder.

Figure 3:
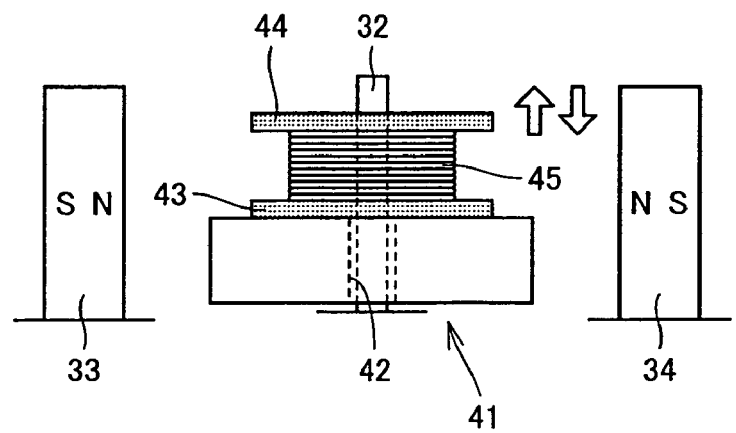
FIG. 3 is a front view of an optical pick-up of the disk drive of FIG. 1.

FIG. 3 is a front view showing slide shaft 32 penetrating slide hole 42 of lens holder 41. A first permanent magnet 33 and a second permanent magnet 34 are located with their magnetic poles of the same polarity opposite to each other, sandwiching lens holder 41. First and second permanent magnets 33 and 34 are secured to lens holder supporting portion 31, as is slide shaft 32, standing erect from the floor surface of the lens holder supporting portion. Lens holder 41 is provided with a focusing coil 45 wound around slide hole 42. When a current is passed through focusing coil 45 for focusing adjustment, magnetic flux is generated from focusing coil 45, which is attracted to or repelled by magnetic flux from the permanent magnets in accordance with a direction of current flow. This causes the lens holder to receive upward or downward force in accordance with the direction of the current flow. Since the pair of permanent magnets have their magnetic poles of the same polarity opposite to each other, when a current is flown through the focusing coil, stress biased upward or downward would not occur. This prevents an adverse effect on focusing.

Figure 4:
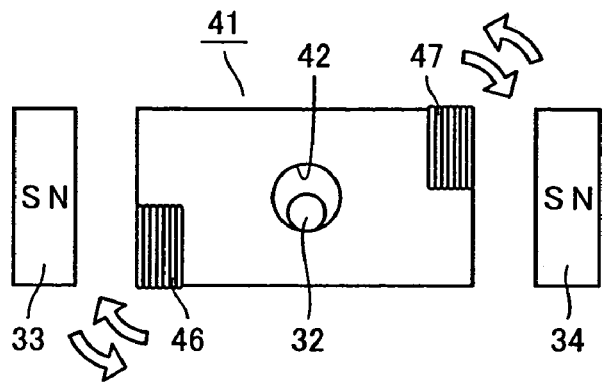
FIG. 4 is a plan view of the optical pick-up of the disk drive of FIG. 1.

FIG. 4 is a plan view of lens holder 41. Tracking coils 46 and 47 are provided on the respective sides of lens holder 41, displaced from the front positions of the permanent magnets. When a current is passed through tracking coils 46 and 47 upon tracking adjustment, magnetic flux is generated from the tracking coils. The magnetic flux is attracted to or repelled by the magnetic flux from the permanent magnets in accordance with the direction of the current flow. In this case, again, since the pair of permanent magnets have their magnetic poles of the same polarity opposite to each other, the rotation direction is not biased in one direction. As such, the magnetic flux from the first and second permanent magnets is used for driving of both focusing and tracking.

Figure 5:
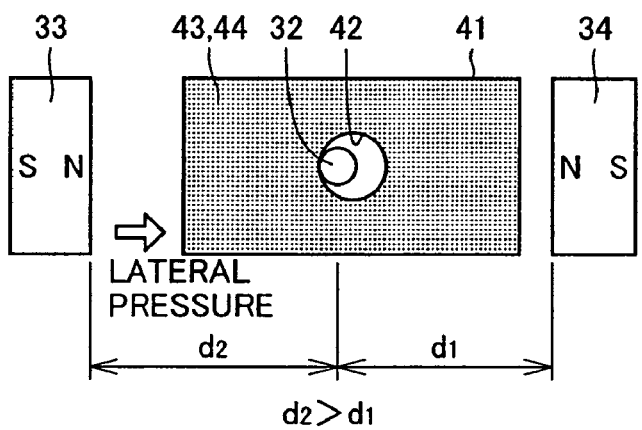
FIG. 5 illustrates distances between a slide shaft and permanent magnets in the optical pick-up of FIG. 1.

FIG. 5 shows arrangement of permanent magnets 33 and 34 according to the present embodiment. Referring to FIG. 5, a distance d1 between slide shaft 32 and one permanent magnet 34 is made shorter than a distance d2 between slide shaft 32 and the other permanent magnet 33. Thus, when permanent magnets 33, 34 of the same magnetizing capability are arranged, the magnetic balance is lost, and lens holder 41 is attracted to the one permanent magnet 34.

The distinctive feature of the present invention is that two ferromagnetic plates are horizontally arranged, spaced from each other in a vertical direction, as shown in FIG. 3. The two ferromagnetic plates, nickel plates in the present embodiment, are arranged to sandwich focusing coil 45 from the top and the bottom. The ferromagnetic plates each have an excellent magnetic permeability, and have a function to attract and introduce magnetic flux therein at high density compared to other spatial portions. That is, they are strongly magnetized and generate great magnetic force. Thus, when the two permanent magnets are arranged to loose magnetic balance as shown in FIG. 5, lens holder 41 is attracted to one permanent magnet side, with lateral pressure produced. The ferromagnetic plates are held horizontally such that their plate surface directions become approximately parallel to the direction of the magnetic flux generated from the permanent magnets. Thus, generation of a demagnetizing field upon magnetization of the thin plates in the plate thickness directions is suppressed, and the plates can be magnetized sufficiently by slightly biasing the magnetic balance. Accordingly, sufficiently large horizontal force (lateral pressure) can be generated at the two positions in the same direction.

Such generation of the sufficiently large horizontal force at the two positions in the same direction allows the sidewall of the slide hole of the lens holder to be pressed against the slide shaft in a stable manner, without causing tilt of the lens holder. Further, upon sliding of the lens holder for focusing or tracking, the pressing force is generated at the two positions. Thus, the pressed position changes smoothly without vibrations, that would be otherwise caused by unstable pressing.

In addition, the nickel plate is less likely to rust, of which magnetic characteristics would not be degraded by working. It is desirable, although not requisite, that the nickel plate is subjected to heat treatment such as annealing, after working in manufacture, to remove strain. The nickel plate also ensures weather resistance for a long period of time.

Figure 6:
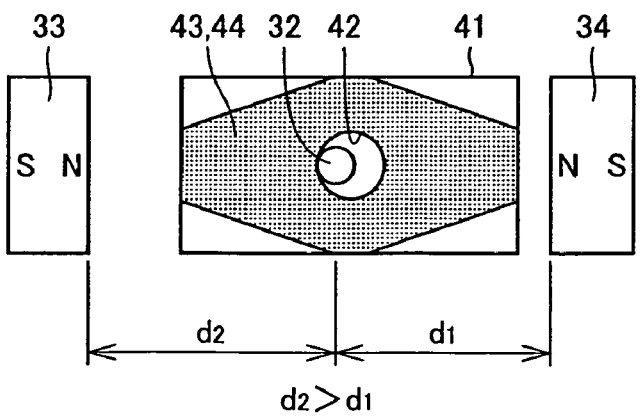
FIG. 6 shows a modification of the optical pick-up of FIG. 5.

Although FIG. 5 shows the nickel plate of a rectangular shape, it may be of a shape as shown in FIG. 6.

Second Embodiment

Figure 7:
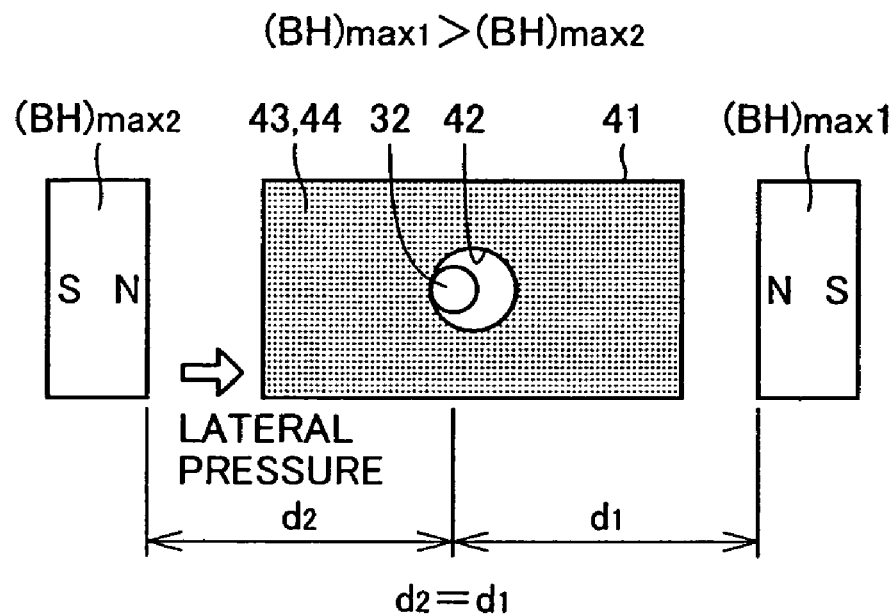
FIG. 7 is a plan view illustrating an optical pick-up according to a second embodiment of the present invention.

FIG. 7 is a plan view showing a lens holder and a lens holder supporting portion according to a second embodiment of the present invention. In the present embodiment, with two permanent magnets 33 and 34 having their magnetic poles of the same polarity opposite to each other, distances d1 and d2 between the slide shaft and the respective permanent magnets 33 and 34 are made equal, whereas the magnetizing forces of the permanent magnets are differentiated from each other. For example, the magnets are made equal in size and different in magnetizing capability of the materials. Specifically, the permanent magnets may be formed of materials different in (BH) max or Hc. Alternatively, one permanent magnet may be made thicker than the other permanent magnet to differentiate their magnetizing forces. In this case, again, generation of a demagnetizing field is suppressed, and strong magnetizing force is generated.

Since one permanent magnet has the magnetizing capability greater than that of the other permanent magnet, the magnetic balance is lost, and lens holder 41 is attracted to the one permanent magnet. Moreover, since the two nickel plates are held horizontally, spaced from each other in a vertical direction as described above, large pressing force (lateral pressure) to press lens holder 41 against slide shaft 32 is generated at the two positions. Accordingly, it is possible to conduct the focusing and tracking, while stably keeping the pressed state and changing the pressed positions.

Third Embodiment

Figure 8:
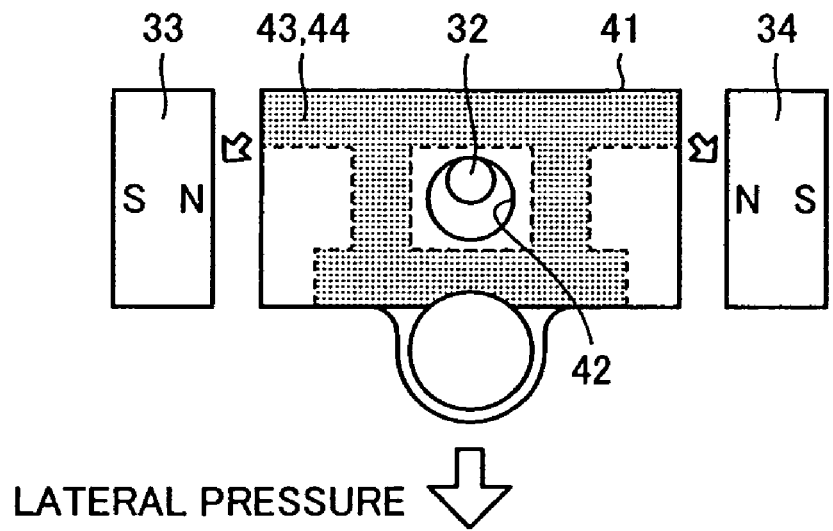
FIG. 8 is a plan view illustrating an optical pick-up according to a third embodiment of the present invention.
Figure 9:
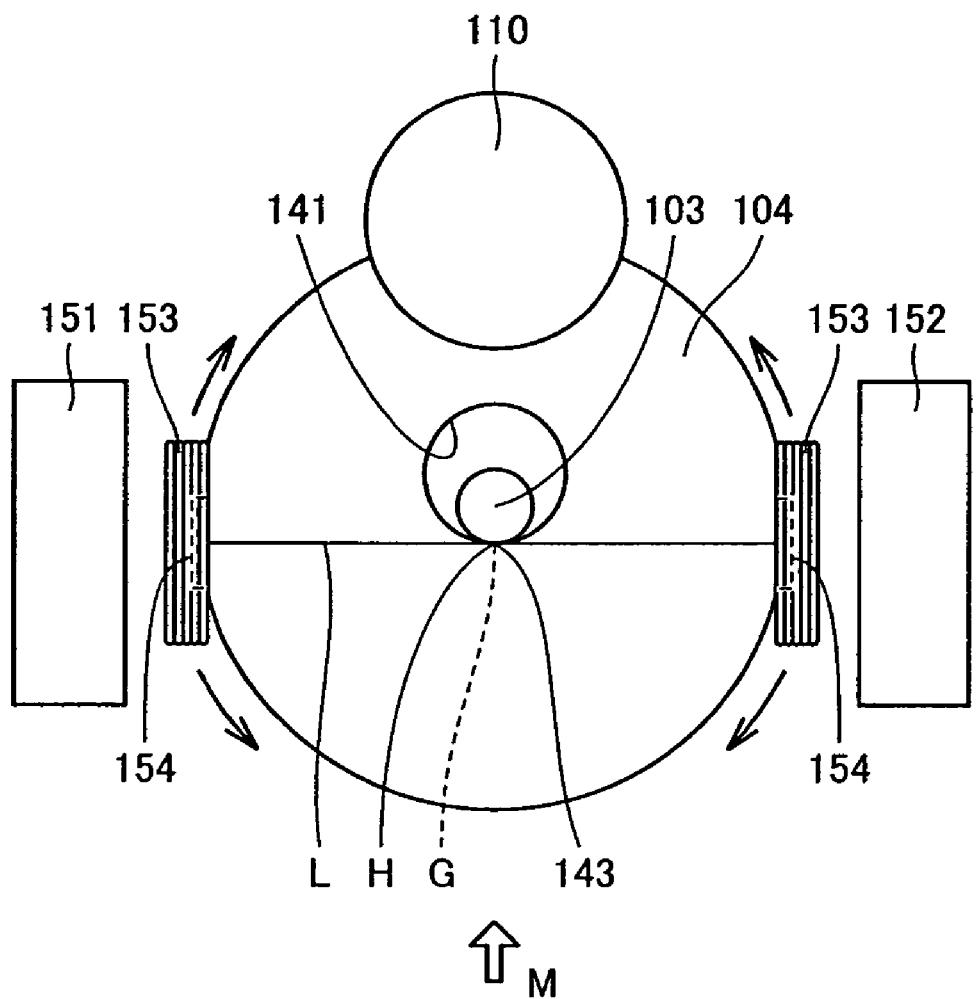
FIG. 9 is a plan view illustrating a conventional optical pick-up.

FIG. 8 shows a lens holder and a lens holder supporting portion according to a third embodiment of the present invention. In the present embodiment, each nickel plate 43, 44 is asymmetric with respect to a straight line passing through slide shaft 32 and connecting permanent magnets 33 and 34. That is, each nickel plate is not the same in shape on one side and the other side of the straight line connecting the two magnets 33 and 34, and has portions extended closer to the respective permanent magnets on the one side. As such, it is also possible to make entire magnetic balance lost and lateral pressure generated by changing the shapes of the nickel plates or the ferromagnetic plates, while maintaining the magnetic balance of the permanent magnets. With this configuration, the force drawn into the central portions of the respective permanent magnets on the one side of the plate surmounts the force drawn into the central portions of the respective permanent magnets on the other side of the plate. Accordingly, lens holder 41 receives force (lateral pressure) in a direction from the one side toward the other side of each plate.

As described above, the lateral pressure is generated at two nickel plates 43 and 44. Thus, the focusing and tracking can be carried out smoothly, keeping lens holder 41 pressed against slide shaft 32, even if its pressed position changes.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A disk drive including a turntable attached to a chassis and rotating a disk mounted thereon, a guide shaft fixed to said chassis, and an optical pick-up rotatably attached to and moving along said guide shaft, wherein said optical pick-up has a lens holder provided with a slide hole and holding an objective lens emitting light beams irradiating the disk on said turntable, and a lens holder supporting portion having a slide shaft penetrating said slide hole and supporting said lens holder, said lens holder includes a focusing coil arranged to be wound around said slide hole for causing the lens holder to move along said slide shaft such that said light beams are focused on a track of said disk, a tracking coil wound at a side portion of the lens holder around a direction crossing said slide shaft for causing the lens holder to rotate around said slide shaft to establish two-dimensional alignment of said light beams, and a pair of ferromagnetic plates arranged to sandwich said focusing coil from the top and the bottom and provided with a hole to include said slide hole, said lens holder supporting portion includes a first permanent magnet and a second permanent magnet sandwiching said lens holder as seen in two dimensions and having their magnetic poles of the same polarity opposite to each other, and a sidewall of the slide hole of said lens holder is pressed against the slide shaft of said lens holder supporting portion.

2. The disk drive according to claim 1, wherein said first and second permanent magnets and said slide shaft are located on a straight line as seen in two dimensions, and a distance between said first permanent magnet and said slide shaft differs from a distance between said second permanent magnet and said slide shaft.

3. The disk drive according to claim 1, wherein said first and second permanent magnets differ in magnetizing capability from each other.

4. The disk drive according to claim 1, wherein each said ferromagnetic plate is magnetized by said first and second permanent magnets, and is asymmetric in shape with respect to said slide hole as seen in two dimensions such that the magnetization occurs in a direction crossing said slide shaft.

5. The disk drive according to claim 1, wherein each said ferromagnetic plate is a nickel plate.

* * * * *